(12) United States Patent
Park et al.

(10) Patent No.: US 12,446,848 B2
(45) Date of Patent: Oct. 21, 2025

(54) METHOD OF MEASURING SPEED OF BLOOD FLOW FROM RF SIGNAL

(71) Applicant: NATIONAL CANCER CENTER, Goyang-si (KR)

(72) Inventors: Dae Woo Park, Goyang-si (KR); Dong Chan Park, Goyang-si (KR)

(73) Assignee: NATIONAL CANCER CENTER, Goyang-si (KR)

( * ) Notice: Subject to any disclaimer, the term of this patent is extended or adjusted under 35 U.S.C. 154(b) by 0 days.

(21) Appl. No.: 18/710,810

(22) PCT Filed: Nov. 21, 2022

(86) PCT No.: PCT/KR2022/018405
§ 371 (c)(1),
(2) Date: May 16, 2024

(87) PCT Pub. No.: WO2023/121002
PCT Pub. Date: Jun. 29, 2023

(65) Prior Publication Data
US 2025/0017552 A1   Jan. 16, 2025

(30) Foreign Application Priority Data
Dec. 24, 2021 (KR) .................. 10-2021-0187018

(51) Int. Cl.
*A61B 8/06* (2006.01)
*A61B 8/00* (2006.01)

(52) U.S. Cl.
CPC .............. *A61B 8/06* (2013.01); *A61B 8/48* (2013.01); *A61B 8/52* (2013.01)

(58) Field of Classification Search
CPC .............. A61B 8/06; A61B 8/48; A61B 8/52
See application file for complete search history.

(56) References Cited

U.S. PATENT DOCUMENTS 6,535,835 B1    3/2003  Rubin et al.
10,603,014 B2 * 3/2020  Sato ................... A61B 8/488
(Continued)

FOREIGN PATENT DOCUMENTS

JP    2001-258887 A    9/2001
JP    2015-515916 A    6/2015
(Continued)

OTHER PUBLICATIONS

Japanese Office Action issued Feb. 25, 2025 in Japanese Patent Application No. 2024-531529, 7 pages.
(Continued)

*Primary Examiner* — Dixomara Vargas
(74) *Attorney, Agent, or Firm* — Oblon, McClelland, Maier & Neustadt, L.L.P.

(57) ABSTRACT

A method of measuring a speed of blood flow from a radio frequency (RF) signal, including decomposing a complex signal converted from the RF signal into base signals using singular value decomposition, classifying the base signals into a clutter signal, a blood flow signal, and a noise signal, separating a clutter region and a blood flow region from the classified clutter signal and blood flow signal, obtaining an output signal by removing the blood flow signal from the clutter signal in the clutter region and by removing the clutter signal from the blood flow signal in the blood flow region, and measuring a speed of the blood flow by calculating speckle decorrelation from the output signal.

5 Claims, 16 Drawing Sheets

(56) References Cited

U.S. PATENT DOCUMENTS

| | | | | |
|---|---|---|---|---|
| 2005/0148875 A1* | 7/2005 | Sato | ............... | A61B 8/06 600/453 |
| 2006/0079782 A1* | 4/2006 | Beach | ............... | G01S 7/52034 600/450 |
| 2007/0066895 A1* | 3/2007 | Sikdar | ............... | A61B 8/13 600/437 |
| 2008/0294019 A1* | 11/2008 | Tran | ............... | G16H 15/00 600/301 |
| 2010/0286522 A1* | 11/2010 | Beach | ............... | A61B 8/08 600/441 |
| 2011/0077526 A1* | 3/2011 | Zwirn | ............... | A61B 8/4416 600/459 |
| 2011/0152689 A1* | 6/2011 | Sato | ............... | A61B 8/06 600/454 |
| 2013/0150717 A1* | 6/2013 | Sato | ............... | A61B 8/466 600/443 |
| 2014/0316274 A1* | 10/2014 | Koh | ............... | G06T 7/20 600/453 |
| 2018/0220997 A1* | 8/2018 | Song | ............... | G16H 50/30 |
| 2018/0325493 A1* | 11/2018 | Takeda | ............... | G01S 15/8977 |
| 2019/0129026 A1* | 5/2019 | Sumi | ............... | G01S 7/52041 |
| 2019/0159750 A1* | 5/2019 | Sato | ............... | A61B 8/06 |
| 2019/0159763 A1* | 5/2019 | Sato | ............... | A61B 8/14 |
| 2019/0298298 A1* | 10/2019 | Li | ............... | A61B 5/6807 |
| 2019/0343482 A1* | 11/2019 | Abe | ............... | A61B 8/5284 |
| 2019/0365355 A1* | 12/2019 | Eldar | ............... | A61B 8/488 |
| 2019/0380684 A1* | 12/2019 | Insana | ............... | A61B 8/5207 |
| 2020/0037994 A1* | 2/2020 | Song | ............... | G01F 1/712 |
| 2020/0069294 A1* | 3/2020 | Sato | ............... | A61B 8/0891 |
| 2020/0081107 A1* | 3/2020 | Shin | ............... | G01S 7/52047 |
| 2020/0275914 A1 | 9/2020 | Chang | | |
| 2021/0267577 A1* | 9/2021 | Trzasko | ............... | A61B 8/488 |
| 2022/0054104 A1* | 2/2022 | Sato | ............... | A61B 8/14 |
| 2022/0087651 A1* | 3/2022 | Alizad | ............... | G06T 11/003 |
| 2022/0211352 A1* | 7/2022 | Kim | ............... | A61B 8/06 |
| 2022/0240899 A1* | 8/2022 | Trzasko | ............... | G01S 7/52026 |
| 2022/0292637 A1* | 9/2022 | Huang | ............... | A61B 8/0891 |
| 2022/0330920 A1* | 10/2022 | Sato | ............... | A61B 8/5207 |
| 2022/0414836 A1* | 12/2022 | Yoshikawa | ............... | G01S 7/52026 |
| 2023/0086332 A1* | 3/2023 | Huang | ............... | A61B 8/488 600/437 |
| 2023/0240658 A1* | 8/2023 | Sato | ............... | A61B 8/5223 600/457 |
| 2023/0368376 A1* | 11/2023 | Kasahara | ............... | A61B 8/0891 |
| 2023/0404540 A1* | 12/2023 | Alizad | ............... | G06V 10/761 |
| 2024/0005490 A1* | 1/2024 | Yoshikawa | ............... | A61B 8/5223 |
| 2024/0032888 A1* | 2/2024 | Yasuda | ............... | A61B 8/488 |
| 2025/0072871 A1* | 3/2025 | Kim | ............... | A61B 8/5246 |
| 2025/0114074 A1* | 4/2025 | Usumura | ............... | A61B 8/5207 |
| 2025/0127480 A1* | 4/2025 | Sato | ............... | A61B 8/06 |
| 2025/0143674 A1* | 5/2025 | Usumura | ............... | A61B 8/5223 |

FOREIGN PATENT DOCUMENTS

| | | |
|---|---|---|
| JP | 2020-96766 A | 6/2020 |
| JP | 2021-186430 A | 12/2021 |
| KR | 10-2021-0107876 A | 9/2021 |
| WO | WO 2021/163307 A1 | 8/2021 |

OTHER PUBLICATIONS

International Search Report issued Mar. 3, 2023 in PCT/KR2022/018405, filed on Nov. 21, 2022, 3 pages.

Lee et al., "Measurement of the Skin Blood Flow using Cross-Correlation", Journal of Biomedical Engineering Research, vol. 19, No. 4, 1998, pp. 379-384.

* cited by examiner

METHOD OF MEASURING SPEED OF BLOOD FLOW FROM RF SIGNAL

CROSS REFERENCE TO RELATED APPLICATIONS

This application is a National Stage entry under 35 U.S.C. § 371 of PCT/KR2022/018405, filed on Nov. 21, 2022, and claims priority to Korean Patent Application No. 10-2021-0187018, filed on Dec. 24, 2021. The entire contents of both are incorporated herein by reference.

TECHNICAL FIELD

The present disclosure relates to a method of measuring the speed of blood flow from an RF signal.

BACKGROUND ART

Recently, it has been required to measure a blood flow rate in micro blood vessels with the development of super micro surgery, etc. Further, it is required to be able to measure a blood flow speed in the vicinity of a blood vessel wall for measurement of shear stress on the blood vessel wall for diagnosis of cardiovascular diseases. In particular, it is important to measure a blood flow rate in real time during surgery.

At present, a blood flow rate is measured using Doppler ultrasonography. Doppler ultrasonography is effective in measuring an average blood flow rate, but has a problem in spatial resolution to measure a micro blood flow or a blood flow speed in the vicinity of a blood vessel wall.

A skin perfusion test using a fluorometry also has a problem to directly observe a vascular network.

A method of measuring the number of blood vessels through histological observation can achieve quantitative analysis about vascular development in some extent, but has a high possibility of error, depending to examiners or cut thin specimens.

Angiography is suitable for morphological result observation of a vascular network, but has a difference in resolution, depending on testing skills and the size of laboratory animals, and is not suitable for quantitative analysis of vascularization, so it has a problem to independently use in observation.

DISCLOSURE

Technical Problem

Accordingly, an objective of the present disclosure is to provide a method of measuring the speed of blood flow from an RF signal.

Technical Solution

The objective of the present disclosure is achieved by a method of measuring a speed of blood flow from an RF signal, the method including: decomposing a complex signal converted from the RF signal into base signals using singular value decomposition; classifying the base signals into a clutter signal, a blood flow signal, and a noise signal; separating a clutter region and a blood flow region from the classified clutter signal and blood flow signal; obtaining an output signal by removing the blood flow signal from the clutter region and by removing the clutter signal from the blood flow signal in the blood flow region; and measuring a speed of the blood flow by calculating speckle decorrelation from the output signal.

The base signal may be expressed as a sum of a plurality of individual base signals, the individual base signals each may include a space singular vector, a time singular vector, and a singular value, and the blood flow signal, the clutter signal, and the noise signal may be classified on the basis of the singular value in the classifying.

In the classifying, the blood flow signal and the clutter signal may be classified on the basis of a magnitude of the singular value.

The separating may comprise: obtaining a feature map on the basis of at least any one of the blood flow signal and the clutter signal; and obtaining the clutter region and the blood flow region by performing image separation on the feature map.

The feature map may be obtained by converting an energy map showing energy of the blood flow signal into a decibel scale.

The method may further comprise smoothing the feature map after obtaining the feature map, wherein the image separation may be performed on the smoothed feature map.

The measuring of a speed of the blood flow may comprise: extracting a sign of the output signal; obtaining a correlation value by inputting the extracted sign into a 1-bit correlator; obtaining a corrected correlation value by correcting the correlation value; and converting the corrected correlation value into a speed of blood flow using speckle calibration, and the speckle calibration may be obtained from data obtained by measuring speckle decorrelation and a speckle movement distance.

Advantageous Effects

According to the present disclosure, a method of measuring the speed of blood flow from an RF signal of a vascular cross-section is provided.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

MODE FOR DISCLOSURE

Hereafter, the present disclosure is described in more detail with reference to the drawings.

The accompanying drawings are only examples shown to describe the spirit of the present disclosure in more detail, so the spirit of the present disclosure is not limited to the accompanying drawings. The thickness, length, etc. of each part may be exaggerated to described the accompanying drawings.

The present disclosure provides a method of measuring the speed of blood flow in a blood vessel, particularly, the speed of blood flow in a micro blood vessel. The present disclosure provides an ultrasound signal processing technique and a blood flow speed measurement algorithm for measuring a blood flow speed.

Figure 1:
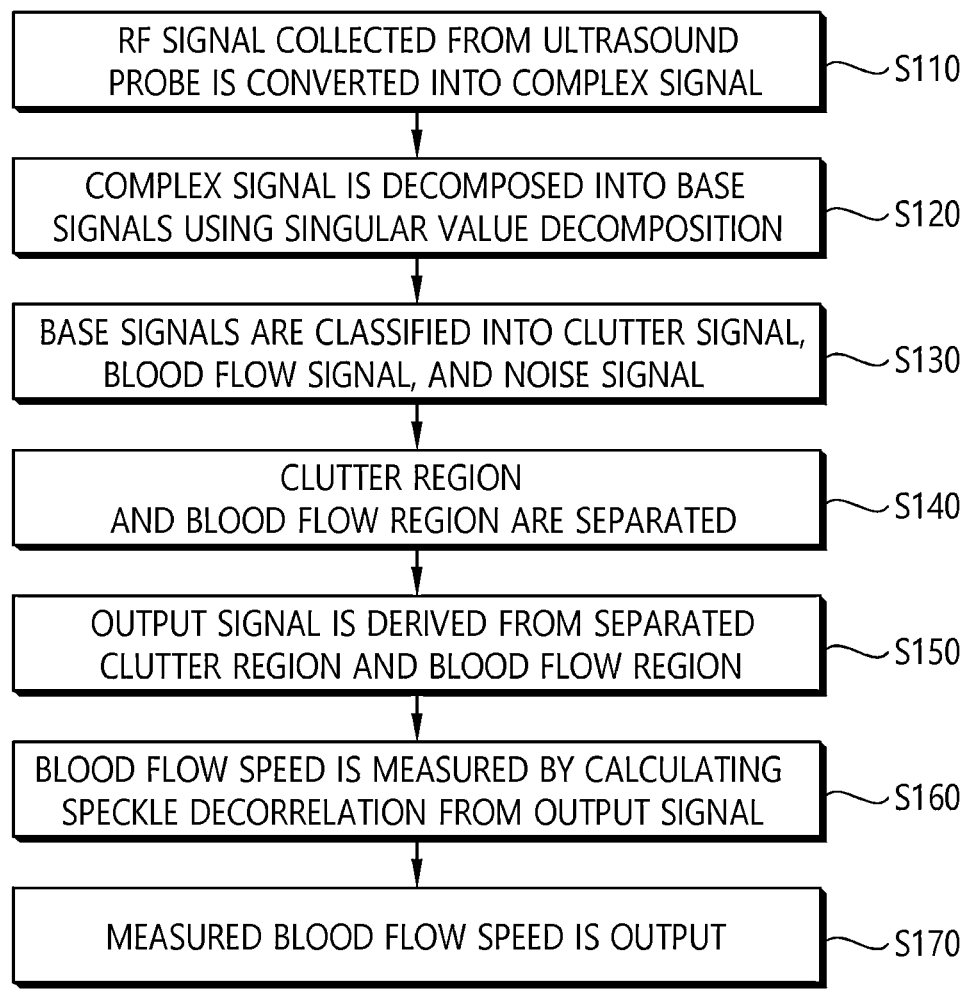
FIG. 1 is a flowchart of a method of measuring a speed of blood flow according to an embodiment of the present disclosure.

Hereafter, the present disclosure is described with reference to FIG. 1 showing a flowchart of a method of measuring a blood flow speed according to the present disclosure.

First, an RF signal collected from an ultrasound probe is converted into a complex signal (S110).

This process can be performed using well-known methods, and I/Q demodulation and decimation may be performed.

Next, the complex signal is decomposed into a base signal using singular value decomposition (S120).

A demodulated ultrasound signal is expressed as follows.

$s(i,j,k), 1 \leq i \leq L, 1 \leq j \leq M, 1 \leq k \leq N$ where N is the number of frames, M is the number of RF lines per frame, and L is the number of samples per RF line. An LM×N data matrix is configured from an ultrasound signal by converting each frame into a column vector.

$$S = \begin{bmatrix} s(1,1,1) & \cdots & s(1,1,N) \\ \vdots & \ddots & \vdots \\ s(L,M,1) & \cdots & s(L,M,N) \end{bmatrix}$$

decomposing the data matrix using SVD, $$S = U\Sigma V = \begin{bmatrix} | & & | \\ u_1 & \cdots & u_N \\ | & & | \end{bmatrix} \begin{bmatrix} \sigma_1 & & \\ & \ddots & \\ & & \sigma_N \end{bmatrix} \begin{bmatrix} | & & | \\ v_1 & \cdots & v_N \\ | & & | \end{bmatrix}.$$

wherein $u_1, u_2, \ldots, u_N$ are N left singular vectors (with a length of LM) perpendicular to each other, $v_1, v_2, \ldots, v_N$ are N right singular vectors (with a length of N) perpendicular to each other, $\sigma_1 \geq \sigma_2 \geq \ldots \geq \sigma_N \geq 0$ are N singular values, and the energy of all of the singular vectors is 1. Physically, the left singular vectors show spatial information, the right vectors time information, and a singular value means energy.

Next, base signals are classified into a clutter signal, a blood flow signal, and a noise signal (S130).

When space singular vectors are expressed into an L×M matrix, an ultrasound signal can be expressed as a sum of N base signals.

$$s(i,j,k) = \sum_{n=1}^{N} \sigma_n u_n(i,j) v_n(k)$$

Each bas signal is composed of a space singular vector $u_N$ and a time singular vector $v_N$, and a singular value on means the magnitude of each bas signal. In general, a clutter signal has intensity very larger than that of a blood flow signal, so it is assumed that a clutter signal has a larger singular value than a blood flow signal. If α-th to β-th singular values correspond to a blood flow signal, an ultrasound signal can be decomposed into a clutter signal and a blood flow signal as follows.

$$s_c(i,j,k) = \sum_{n=1}^{\alpha-1} \sigma_n u_n(i,j) v_n(k), \; s_f(i,j,k) = \sum_{n=\alpha}^{\beta} \sigma_n u_n(i,j) v_n(k)$$

The other β+1-th to N-th singular values correspond to noise. Two parameters α and β that discriminate clutter, blood flow, and noise may be determined by the method proposed in [Baranger 2018], etc.

A method of classifying time and space singular vectors into clutter/blood flow/noise is additionally described as follows.

Various singular vector classification methods were proposed, but it has been known that the performance of a method of spatial similarity is the best [Baranger 2018]. This method calculate similarity between space singular vectors and then collects singular vectors with high similarity, thereby making two groups. A group with a large singular value of the two groups is classified as clutter, a group with a small singular value is classified as blood flow, and the other singular vectors not included in the groups are classified as noise.

Figure 2:
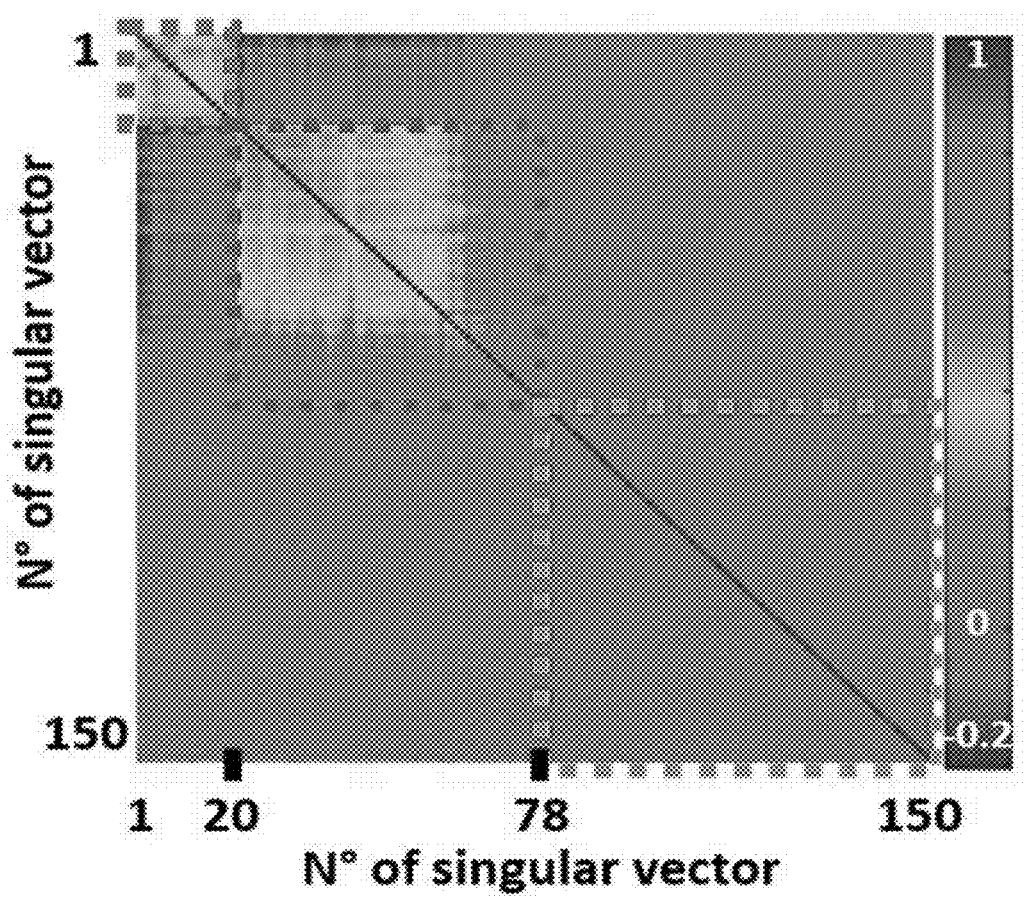
FIG. 2 shows a similarity matrix of space singular vectors.

When similarity of space singular vectors is calculated, for example, as shown in FIG. 2, a similarity matrix is obtained. In this case, the first group is clutter with singular values of 1~19, the second group is blood flow with singular values of 20~77, and the other one is noise with singular values of 78~150. That is, two parameters that discriminate clutter/blood flow/noise in SVD are =20 and =77 that are the singular value ranges of blood flow.

FIG. 2 shows a similarity matrix of space singular vectors, in which the values in the i-row and j-column show similarity between i-th and j-th space singular vectors.

Next, a clutter region and a blood flow region are separated (S140).

When clutter is removed using SVD in Doppler ultrasound wave or speckle tracking, all of clutter signals existing in an interest region are removed and the speed of blood flow is measured using only a blood flow signal. However, when all of clutter signals are removed in speckle decorrelation, a large error is generated in blood measurement values of the blood flow speed in the vicinity of a blood vessel wall and in perivascular tissues. This is because a speckle decorrelation technique measures a flow speed by calculating correlation over time of a speckle pattern. Accordingly, when a clutter signal is removed at a position without a blood flow signal, only noise is left, so decorrelation of speckles increases and a very high flow speed is measured even though there is no blood flow In the present disclosure, instead of removing clutter in all regions, a blood flow signal is removed in a clutter region and a clutter signal is removed in a blood flow region, whereby a signal suitable for calculation speckle decorrelation is produced.

The separating step (S140) is performed through feature map extraction and region separation.

First, the energy of a blood flow signal is calculated as follows.

$$E_f(i, j) = \sum_{k=1}^{N} |s_f(i, j, k)|^2 = \sum_{n=\alpha}^{\beta} \sigma_n^2 u_n^2(i, j)$$

A feature map is obtained by converting this energy map into a decibel (dB) scale.

$I(i,j)=10 \log_{10} E_f(i,j)$ [dB]

Clutter energy or clutter blood flow ratio may be used as a feature map instead of blood flow energy.

The clutter blood flow ratio may be obtained by calculating the energy ratio of a clutter signal and a blood flow signal in a dB scale.

A feature map is smoothed and then separated into a clutter region and a blood flow region using Otsu method. A Gaussian filter may be used for smoothing, and in other embodiments, various image separation techniques such as k-means clustering other than Otsu method may be used for region separation.

Thereafter, an output signal is derived from the separated clutter region and blood flow region (S150).

Let's assume that a clutter region and a blood flow region obtained through region separation are $A_c$ and $A_f$, respectively. A blood flow signal is removed in the clutter region and a clutter signal is removed in the blood flow region, whereby an output signal is obtained as follows.

$$x(i, j, k) = \begin{cases} s_c(i, j, k), & (i, j) \in Ac \\ s_f(i, j, k), & (i, j) \in Af \end{cases}$$

Next, the speed of blood flow is measured by calculating speckle decorrelation from the output signal (S160).

The sign of an SVD filter output IQ signal is extracted (1 bit on an I axis and 1 bit on a Q axis). That is, the sign of a correlator input signal (output signal) x(i, j, k) is taken as follows (a sign is given to each the real part and the imaginary part of a sign function).

$b(i,j,k)=\text{sign}(x(i,j,k))$

Next, a correlation value of a signed signal is calculated using a 1-bit correlator.

$$R(i, j, m) = \sum_{i',j',k} b(i', j', k)b^*(i', j', k-m)$$

where i' and j' are space windows having i and j as centers and k is a time window.

A 1-bit correlator uses Bussgang theorem that is one of stochastic probability theories. When the statistical property of a signal follows Gaussian distribution, even though this signal is distorted, it is possible to measure correlation of the original signal. That is, it is possible to obtain the correlation of an original signal by calculating the correlation of a nonlinearly distorted signal and then compensating correlation in accordance with Bussgang theorem. In the present disclosure, a sign extractor may take charge nonlinear distortion. A sign extractor extracts only a sign bit from an original signal. Since an ultrasound speckle signal usually follows Gaussian distribution, it is possible to measure correlation using even only the sign (1 bit) of an ultrasound speckle signal.

Since a signal is expressed in 1 bit in this process, there is no need for a multiplication operation, so real-time measurement is possible.

Next, a correlation value is corrected as follows. This compensates distortion of a correlation value that is generated by a correlator and is based on Bussgang theorem.

$$r(i, j, m) = \sin\left(\frac{\pi}{2} R(i, j, m)\right)$$

Next, the correlation value is converted into the speed of blood flow using the corrected correlation value and speckle calibration data.

Speckle calibration data is data obtained by measuring the relationship between speckle decorrelation and a speckle movement distance. Speckle calibration data is the unique property of an ultrasound system and it is possible to obtain the functional relationship of a movement distance and decorrelation by moving an ultrasound probe to an accurate stage.

Finally, the measured speed of blood flow is output (S170). Outputting may be performed in various ways such as displaying on a display and transmitting to the outside through a computer network.

According to the present disclosure described above, it is possible to measure the speed of blood flow without using an ultrasound contrast medium. That is, since clutter and noise are removed through signal processing, there is no need for an ultrasound contrast medium. Further, the amount of calculation for calculating the speed of blood flow, so it is possible to measure the speed of blood flow in real time.

Hereafter, the present disclosure is described in more detail through simulations and tests.

Verification of Algorithm Through Simulation

The performance of a developed algorithm was verified using Field II that is an ultrasound simulation toolbox of MATLAB. Simulation parameters are as in Table 1.

TABLE 1

| Parameter | Value |
|---|---|
| Center frequency | 10 MHz |
| Excitation pulse | 2-cycle sinusoid |
| Sound velocity | 1540 m/s |
| Sampling frequency | 100 MHz |
| Number of elements | 128 |
| Element pitch | 0.3 mm |
| Element width | 0.28 mm |
| Element height | 4 mm |
| Frame rate | 1000 Hz |
| Imaging mode | Plane wave |
| Blood flow | 2.5 cm/s |
| Tissue motion | 1 mm/s |
| Clutter-to-blood ratio | 30 dB |
| Blood-to-noise ratio | 10 dB |

Figure 3A:
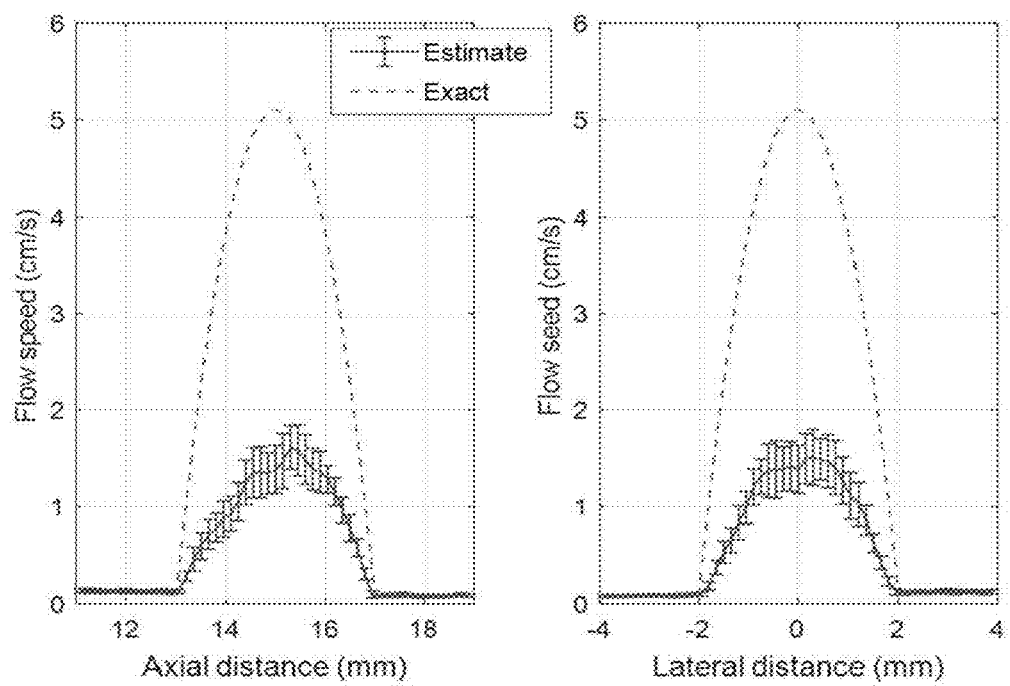
FIG. 3A and FIG. 3B show a result of measuring a flow speed in Field II simulation.
Figure 3B:
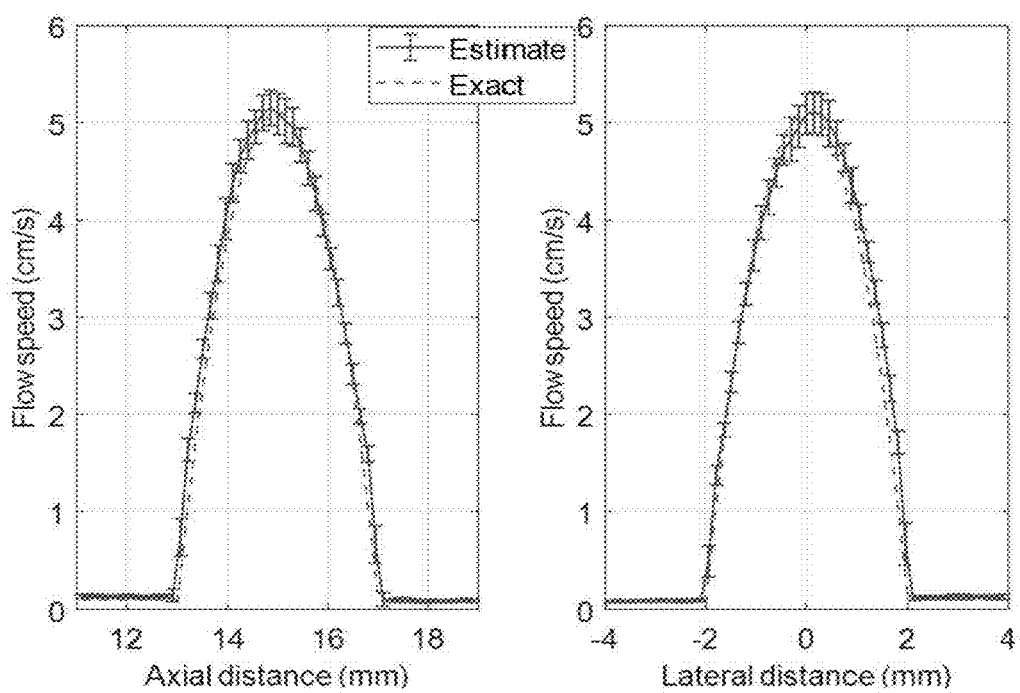

FIG. 3A and FIG. 3B show results of measuring a flow speed before and after applying a developed SVD filter, in which an average value and a standard deviation after measuring a flow speed twenty times are shown.

A flow speed diagram (ground truth) theoretically obtained was shown with red. FIG. 3A is the case before SVD is applied and FIG. 3B is the case after SVD is applied.

According to the existing speckle decorrelation technique, the flow speed measurement value was greatly underestimated when an ultrasound contrast medium is not used. However, the accuracy of measurement of a flow sped was increased through the developed SVD-based speckle decorrelation technique even without an ultrasound contrast medium.

A flow rate measurement value was 8.66±0.16 mL/min before SVD was applied, but, after SVD was applied, the flow rate measurement value was 20.99±0.14 mL/min, which was close to a ground truth of 19.6 mL/min.

Verification Through In Vitro Phantom Test

Figure 4:
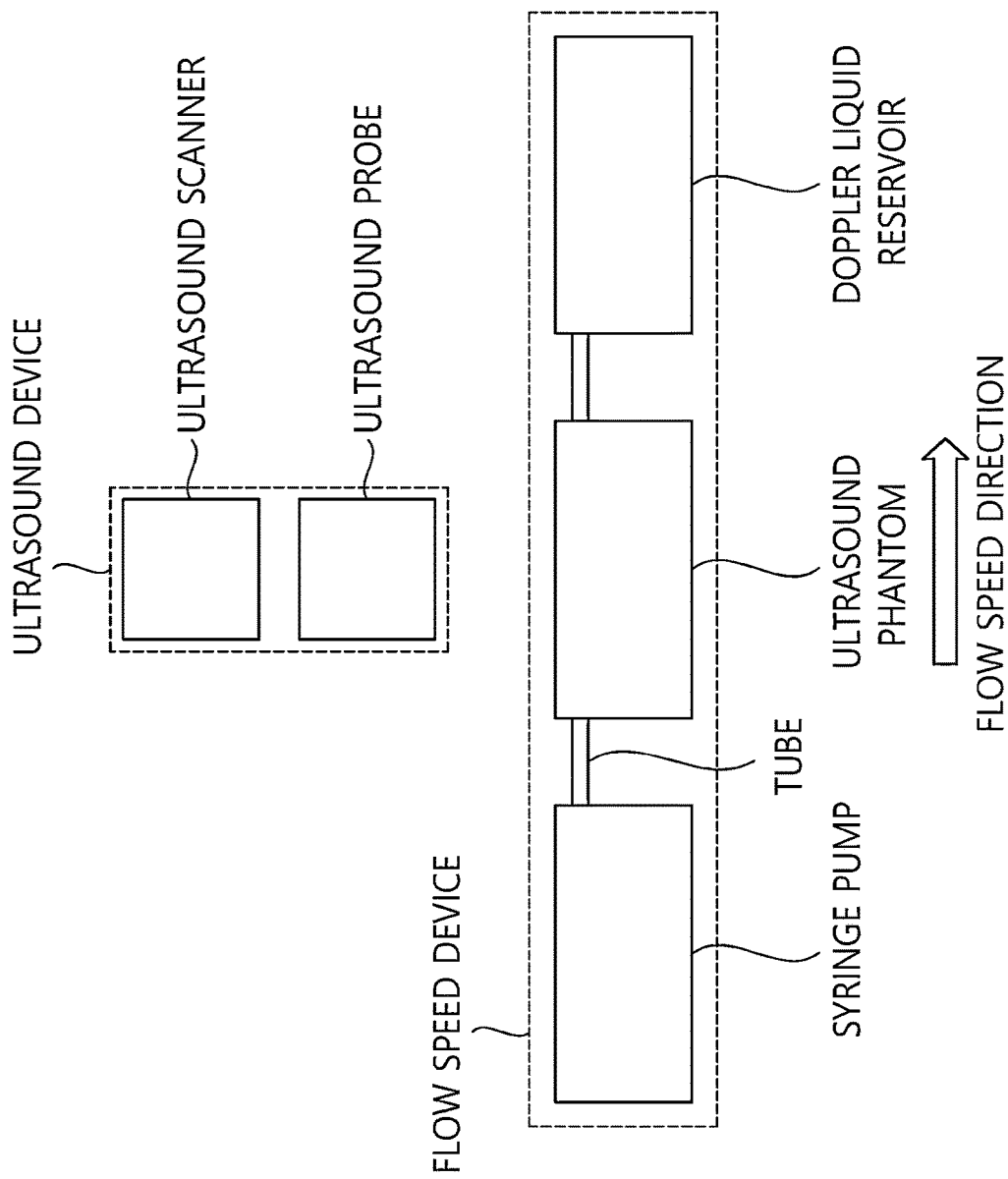
FIG. 4 shows an ultrasound flow speed measurement tester.

As in FIG. 4, an ultrasound flow speed measurement tester including a flow speed device and an ultrasound device was prepared.

The flow speed device is composed of a syringe pump, a tube, an ultrasound phantom, and a Doppler liquid reservoir.

A Doppler solution was injected into a tube of 4 mm using a syringe pump (NE-300) (flow rate of 20 and 40 mL/min).

An ultrasound phantom having a tube with a diameter of 4 mm was manufactured (Agar 2% and glass-beads 1%). Particles with a diameter of 5 μm that simulate red corpuscles were put in the Doppler liquid.

A clutter signal was generated by moving a probe at a speed of 1 mm/s using a linear stage.

The ultrasound device was composed of an ultrasound probe (center frequency: 10 MHz) and an ultrasound scanner (frame rate: 100 Hz).

Figure 5:
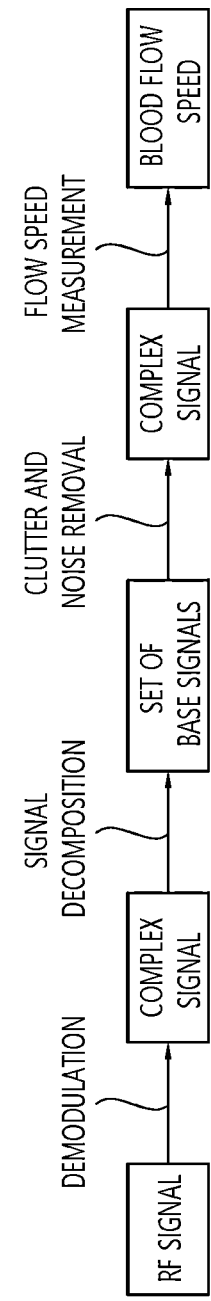
FIG. 5 shows a procedure of measuring a blood flow speed in an in vitro phantom test.

FIG. 5 shows a procedure of measuring a blood flow speed from an RF signal collected from an ultrasound probe.

The RF signal collected from the ultrasound probe was converted into a complex signal (I/Q demodulation and decimation were performed), the complex signal was decomposed into base signals (using singular value decomposition), the base signals were classified into clutter/blood flow/noise, clutter was removed on the basis of region separation, and speckle decorrelation was calculated, whereby measurement of a blood flow speed was performed.

Cluster noise and a considerable amount of electrical noise were included in the signal of the Doppler liquid part.

Figure 6:
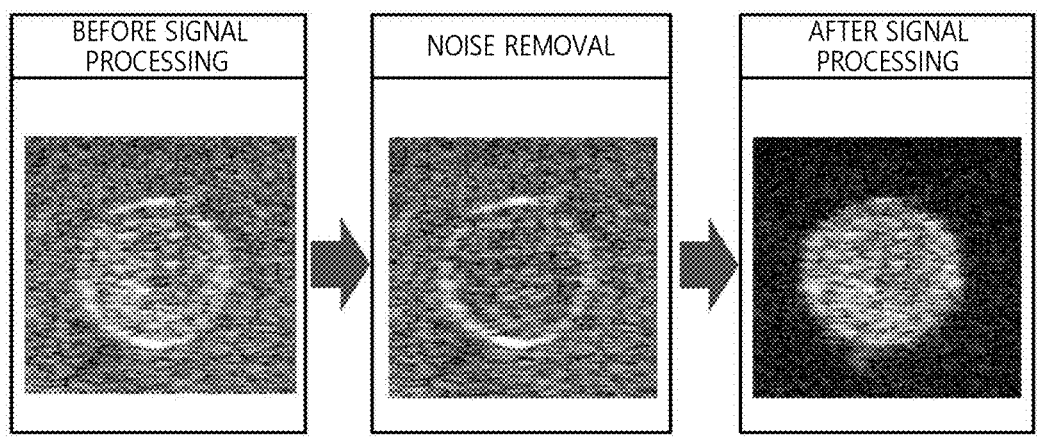
FIG. 6 shows B-mode images of a vertical cross-section of a blood vessel before and after signal processing in an in vitro phantom test.

FIG. 6 shows B-mode images of blood flow before and after signal processing in a phantom test. A signal of a pure Doppler liquid part was obtained by removing clutter noise and electrical noise using a signal processing technique and the SNR of the Doppler liquid part was very improved.

Figure 7A:
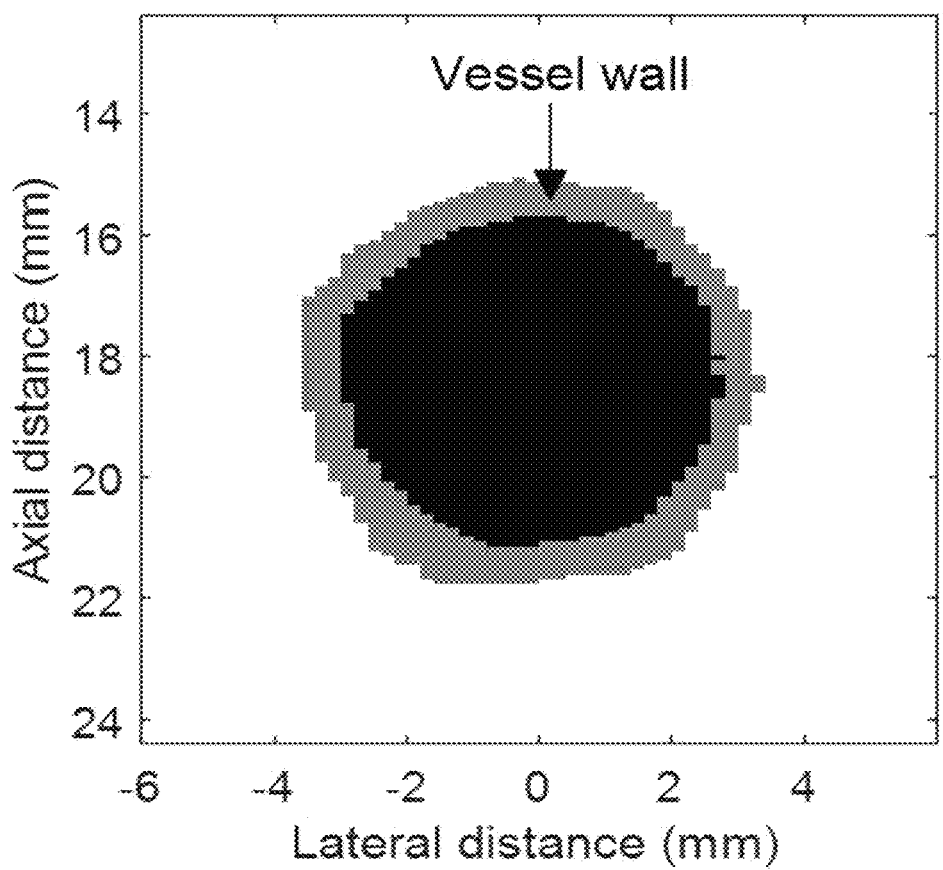
FIG. 7A and FIG. 7B show a result of measuring blood flow in an in vitro phantom test.
Figure 7B:
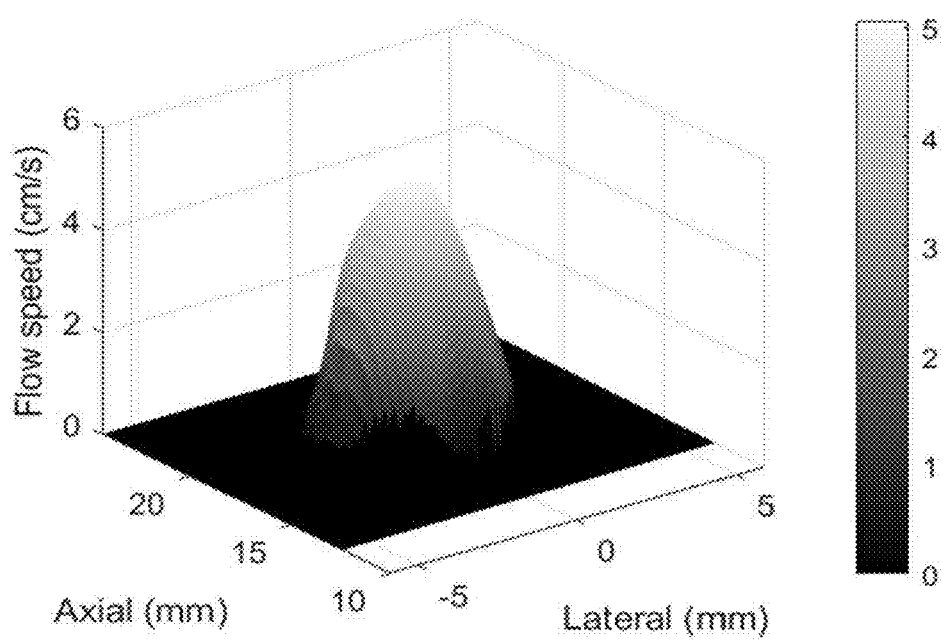

As in FIG. 7A and FIG. 7B, a blood vessel wall that is the boundary between Doppler liquid and surrounding tissues was detected (A) and a blood flow speed was measured (B).

Figure 8A:
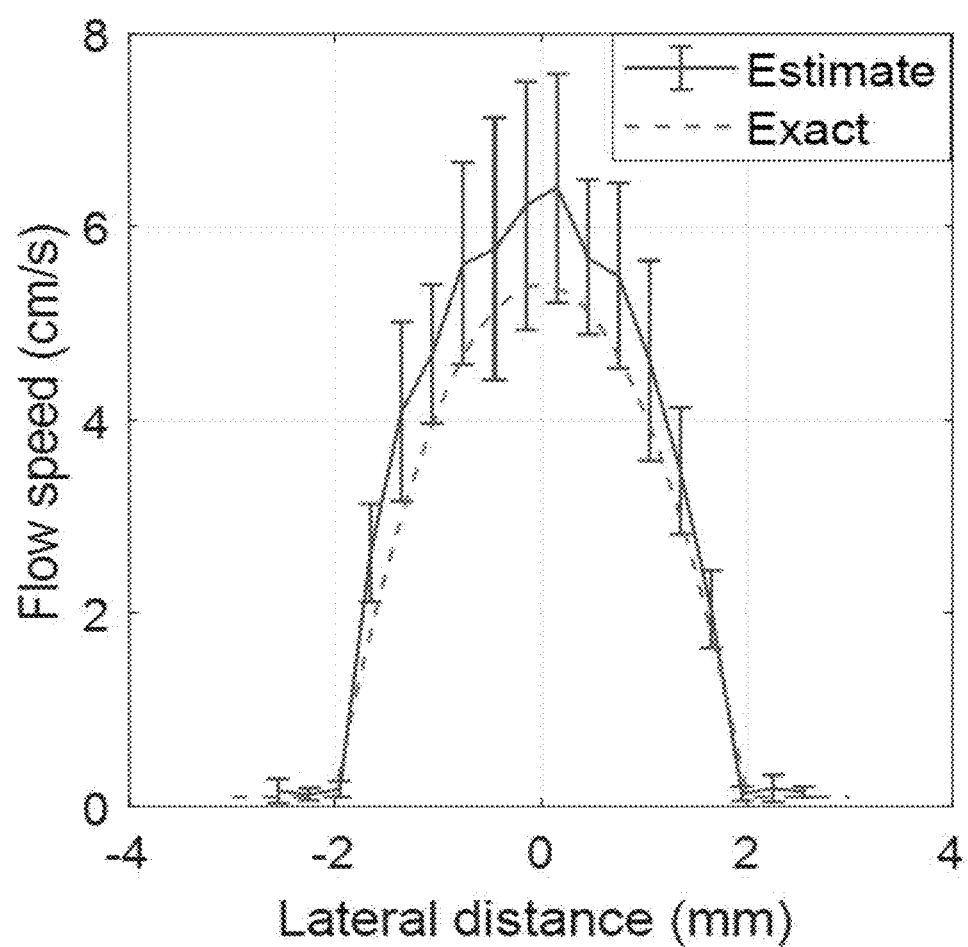
FIG. 8A and FIG. 8B show flow speed measurement values at the center portion of a blood vessel in an in vitro phantom test.
Figure 8B:
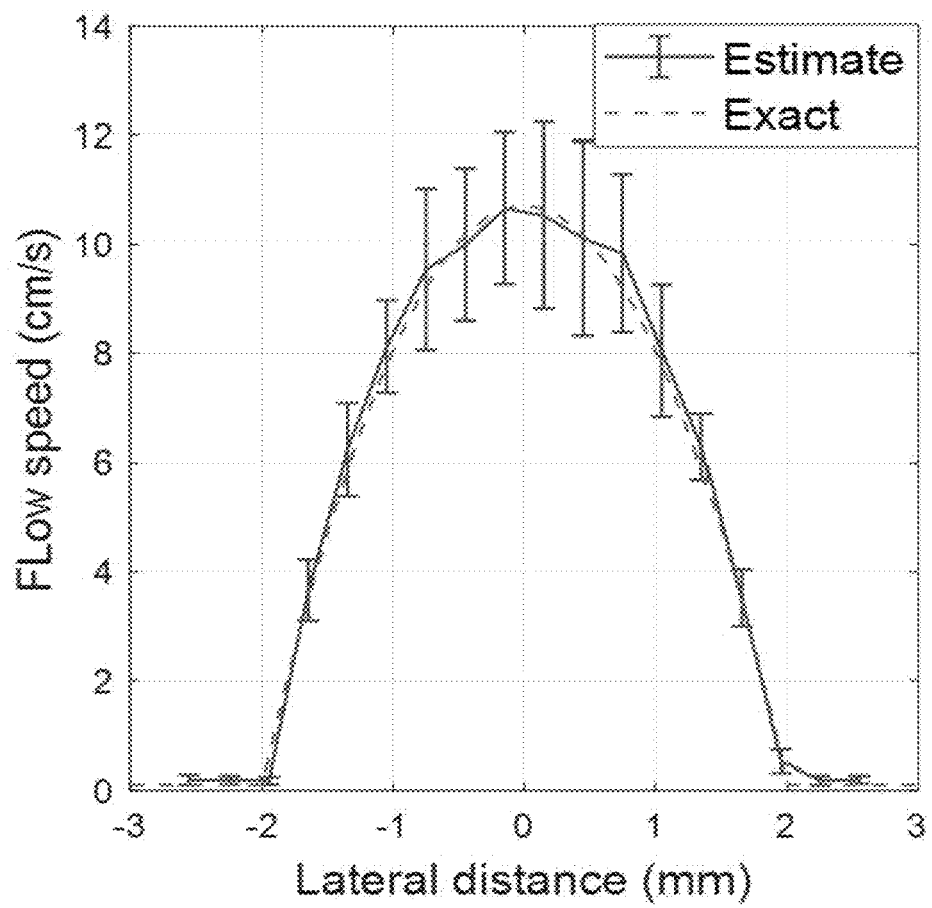

FIG. 8A and FIG. 8B shows blood speed measurement values at the center portion of a blood vessel, in which the blood flow rate was 20 ml/min in FIG. 8A and the blood flow rate was 40 ml/min in FIG. 8B.

FIG. 8A and FIG. 8B show an average and a standard deviation of flow speeds measured ten times at a depth of 15 mm.

It was possible to detect a blood vessel wall and measure an accurate blood flow speed even under not only fixed clutter, but clutter moving at a speed of 1 mm/s.

Checking of Clinical Applicability Through In Vivo Measuring

A carotid of a healthy 45-year-old adult male was measured at a center frequency of 6.6 MHz with a SonixTouch system. A carotid with a diameter of about 6 mm was adjusted to be positioned at the center of the visual field of a probe in a sitting posture and then a vertical cross-section of the carotid was measured at a frame rate of 925 Hz, whereby RF data of 1000 frames was obtained.

The center of a blood vessel with a 5 mm width and a 25 mm height was positioned at about 15 mm depth.

An SVD filter was applied to the RF data of 1000 frames and then a flow speed was measured by applying a speckle decorrelation algorithm to every 100 frames.

Figure 9:
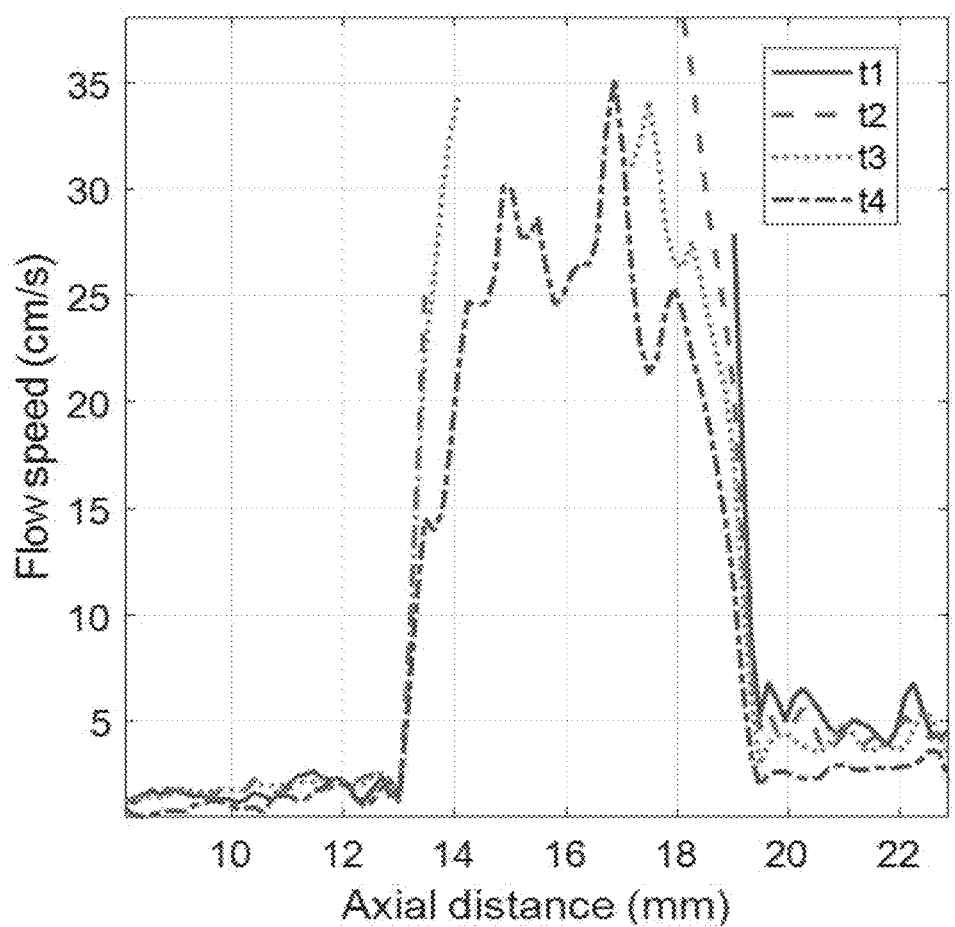
FIG. 9 shows a result of measuring a flow speed in an in vivo test.

FIG. 9 shows B-mode images before an SVD filter is applied and the profile of a flow speed measured at the center of a blood vessel and shows a flow speed (interval of 0.1 s) at a center line (x=0).

A flow speed measured through a speckle decorrelation technique was smoothed using a Savitzky-golay (third times and five sample) to reduce noise.

It was possible to observe well flow speed variation in the vicinity of a blood vessel wall positioned deeper and movement of the blood wall.

It was limited to measure the maximum flow speed (about 100 cm/s) at the center of the carotid due to the limit (1,000 Hz) of frame rate of the ultrasound equipment, but it was possible to measure the low flow speed in the vicinity of the blood vessel wall with high resolution.

Figure 10A:
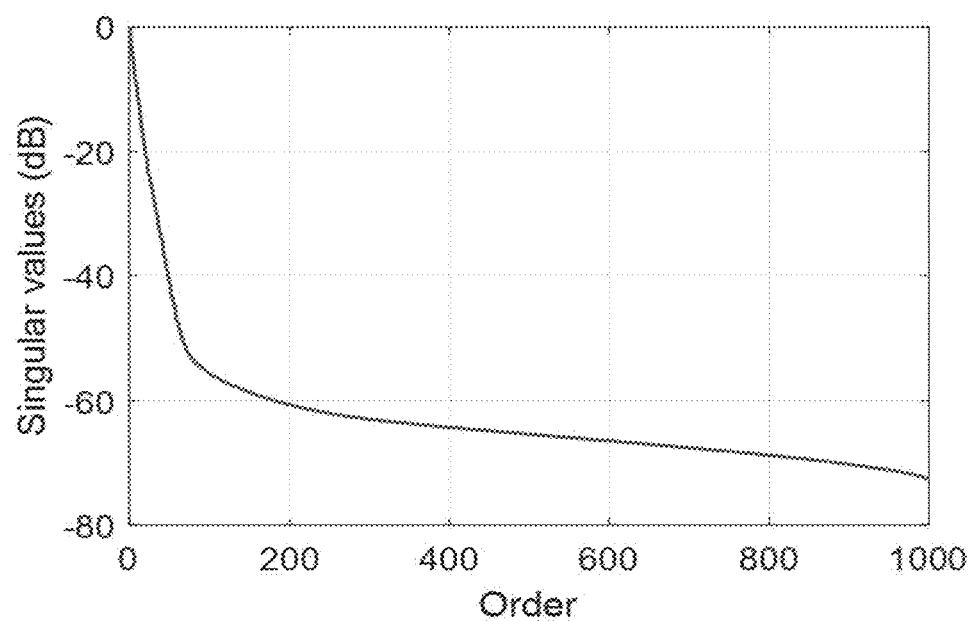
FIG. 10A to FIG. 10D exemplify an SVD result of carotid artery measurement ultrasound data in an in vivo test.
Figure 10B:
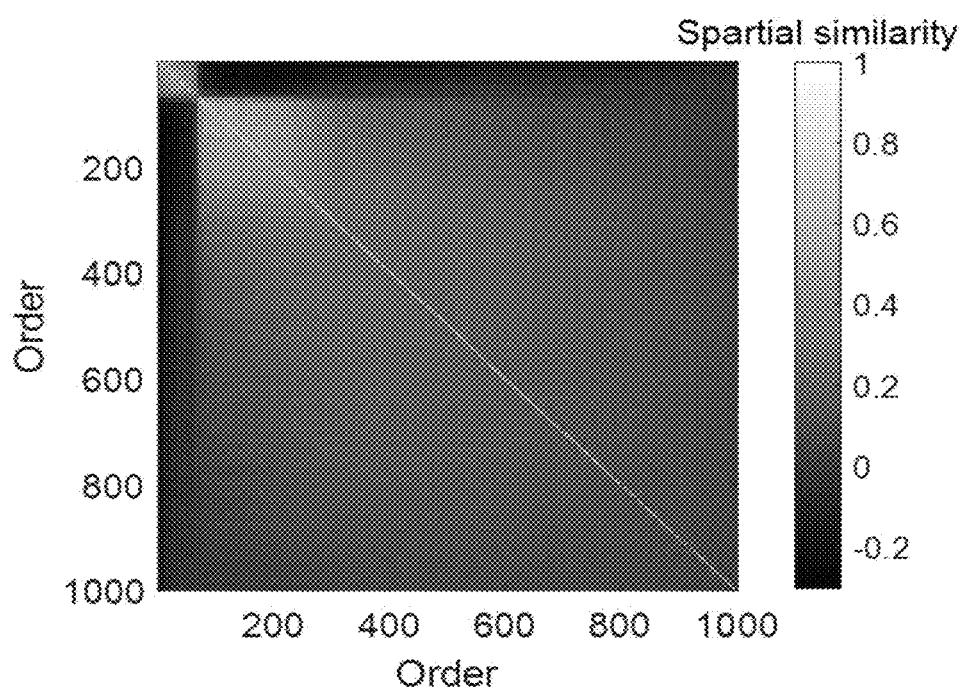
Figure 10C:
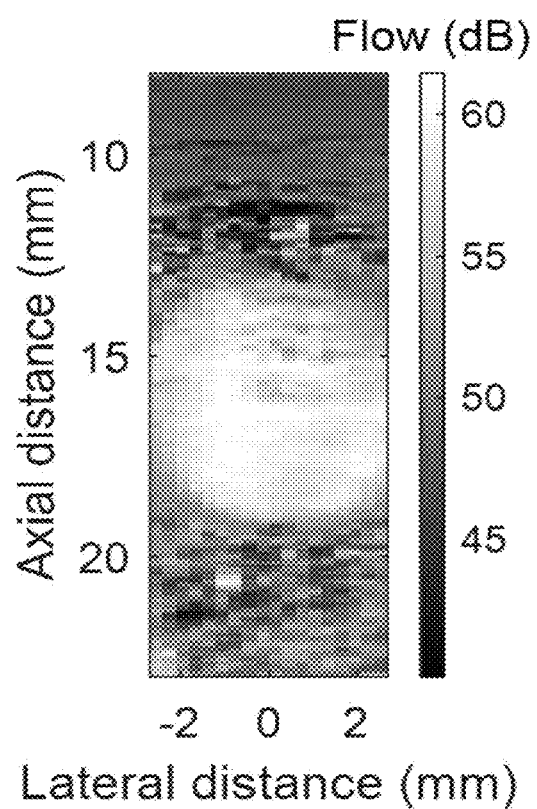
Figure 10D:
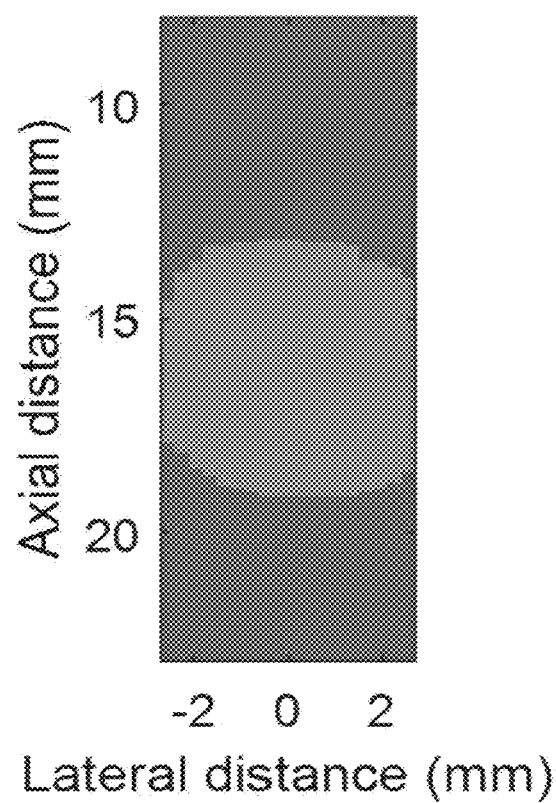

FIG. 10A to FIG. 10D exemplify SVD results of data obtained by measuring a carotid. FIG. 10A is a singular value curve, FIG. 10B shows spatial similarity, FIG. 10C is a power Doppler map of a blood flow region, and FIG. 10D shows a segmentation result of a blood flow region.

As shown in the singular value curve, clutter signals have power greatly larger than a blood flow signal (a difference of about 40 dB). A clutter singular value section was determined as [1 54] and a blood flow singular value section was determined as [55 400] from the spatial similarity.

The power Doppler and results of segmentation show the region of a blood flow signal and it is seen that the proposed SVD filter can clearly decomposed horizontal cross-section data of a carotid into clutter and a blood flow signal.

The embodiments described above are examples for describing the present disclosure and the present disclosure is not limited thereto. Those skilled in the art would achieve the present disclosure through various modifications, so the technical protective range of the present disclosure should be determined by the accompanying claims.

The invention claimed is:

1. A method of measuring a speed of blood flow from a radio frequency (RF) signal, the method comprising:
    decomposing a complex signal converted from the RF signal into base signals using singular value decomposition;
    classifying the base signals into a clutter signal, a blood flow signal, and a noise signal;
    separating a clutter region and a blood flow region from the classified clutter signal and blood flow signal, wherein the separating comprises
        obtaining a feature map on a basis of at least one selected from the group consisting of a) the blood flow signal and b) the clutter signal and the blood flow signal, wherein the feature map is obtained by converting an energy map showing energy of the blood flow signal into a decibel scale, and
        obtaining the clutter region and the blood flow region by performing image separation on the feature map;
    obtaining an output signal by removing the blood flow signal from the clutter signal in the clutter region and by removing the clutter signal from the blood flow signal in the blood flow region; and
    measuring a speed of the blood flow by calculating speckle decorrelation from the output signal.

2. The method of claim 1, wherein the base signals are expressed as a sum of a plurality of individual base signals, the individual base signals each include a space singular vector, a time singular vector, and a singular value, and the blood flow signal, the clutter signal, and the noise signal are classified on a basis of the singular value in the classifying.

3. The method of claim 2, wherein, in the classifying, the blood flow signal and the clutter signal are classified on a basis of a magnitude of the singular value.

4. The method of claim 1, further comprising smoothing the feature map after obtaining the feature map,
wherein the image separation is performed on the smoothed feature map.

5. The method of claim 1, wherein the measuring of a speed of the blood flow comprises:
extracting a sign of the output signal;
obtaining a correlation value by inputting the extracted sign into a 1-bit correlator;
obtaining a corrected correlation value by correcting the correlation value; and
converting the corrected correlation value into a speed of blood flow using speckle calibration,
wherein the speckle calibration is obtained from data by measuring speckle decorrelation and a speckle movement distance.

* * * * *